A. HENRY.
GRAMOPHONE.
APPLICATION FILED FEB. 21, 1908.
902,579.
Patented Nov. 3, 1908.
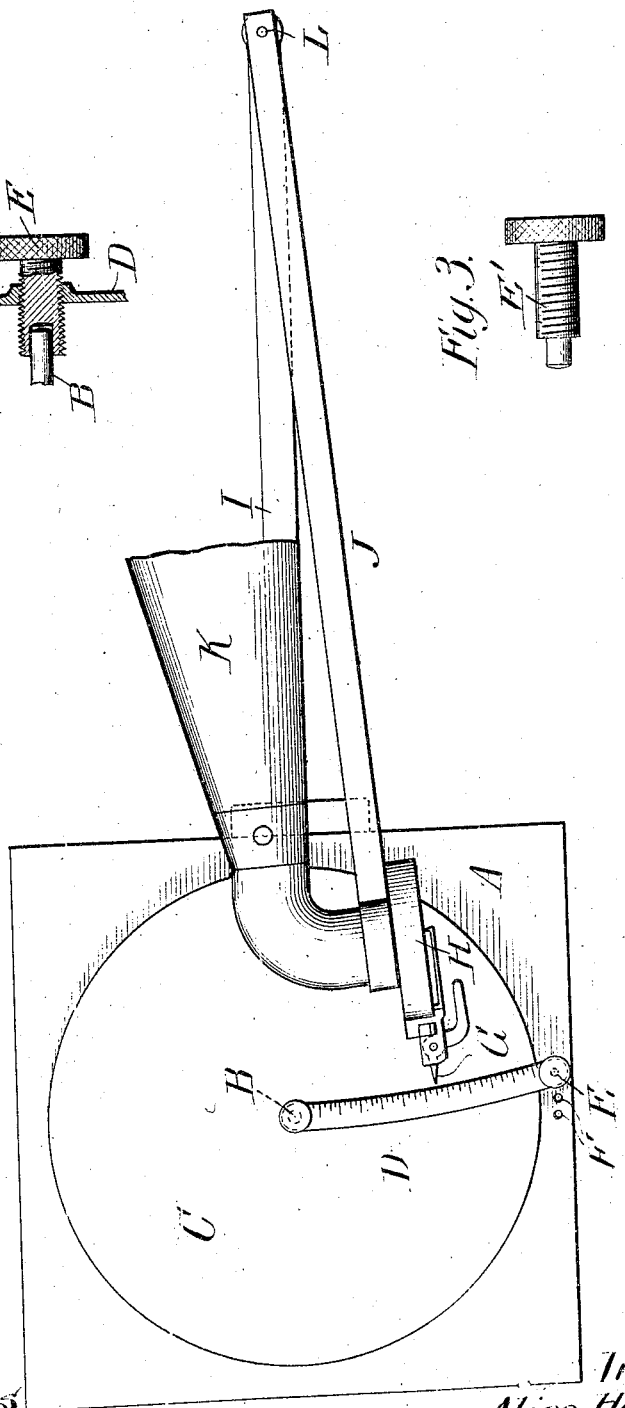
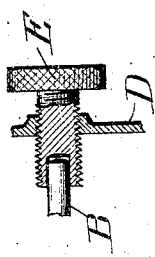
Witnesses
Harry R. L. White
R. A. White
Inventor
Alice Henry
By Morgan & Rubinstein Attys

UNITED STATES PATENT OFFICE.

ALICE HENRY, OF CHICAGO, ILLINOIS.

GRAMOPHONE.

No. 902,579.  Specification of Letters Patent.  Patented Nov. 3, 1908.

Application filed February 21, 1908. Serial No. 417,018.

*To all whom it may concern:*

Be it known that I, ALICE HENRY, a subject of the King of Great Britain, residing at 71 Park avenue, in the city of Chicago, county of Cook, and State of Illinois, have invented a new and useful Improvement in Gramophones, of which the following is a specification.

The object of my invention is to provide means whereby the needle point of the producer or reproducer can be instantly set at any desired radial point of the record disk for the purpose of utilizing all the surface of the disk where the recording is interrupted and needle removed from the disk; and for repeating any particular part of a record when the instrument is used for teaching or other purposes.

The manner in which I accomplish my object is described in the following specifications and illustrated in the accompanying drawing in which Figure 1 is a top view of a box inclosing the mechanism; the record disk mounted thereon; the supporting bracket; the horn and reproducer and a scale supported above the disk adjacent to the line of travel of the needle. Fig. 2 is a detail showing an adjustable screw pivoted on the center shaft of the mechanism and supporting one end of the scale. Fig. 3 is a detail view of an adjustable screw pivoted in the top of the box and adapted to support the other end of the scale.

In the drawings A indicates the box containing the motor mechanism.

The dotted line B indicates the end of the vertical shaft on which the record disk C is supported and by which it is rotated.

D is a scale which is pivotally supported at one end on the shaft B, and at the other end is supported on the box A. In the end of the scale on the shaft is an adjustable screw E threaded in the scale and having a hollow end adapted to admit the end of the shaft B. At the other end of the scale is an adjustable screw E', the point of which is insertible in one of the holes F in the box A. By the adjustment of these screws the height of the scale D above the disk can be regulated. The edges of the scale form part of a circle, the center of which is the pivotal point of the bracket and arm supporting the needle and horn. The face of the scale is divided by marks adapted to indicate any desired point on the disk at which the operator desires to set the needle.

The needle is indicated by the letter G. The reproducer by the letter H. The bracket by I. The arm by the letter J. The pivotal point by L and the horn by K. All of these parts except the scale and its adjustable screws are referred to simply as usual parts of the instrument of this kind.

What I claim and desire to secure by Letters Patent is:

1. In a gramophone, the combination consisting of a case and aperture therein; a motor mechanism in said case, a vertical shaft of said mechanism extending through said case, a bracket and pivotal arm supported by said case, a reproducer supported on said arm; a record disk supported on said shaft; a scale extending transversely over said disk, one end of said scale being pivotally supported on the end of said shaft and the other end supported in said aperture in said case as described.

2. In a gramophone, a case, a reproducer arm and reproducer support on said case; a motor mechanism in said case having a vertical shaft, a record disk thereon; a scale plate supported on said shaft and case transversely over said disk, one edge of said disk being coincident with an imaginary line traversed by a needle in said reproducer, as described.

3. In a machine of the kind described having a case, a reproducer arm and reproducer supported thereon, and motor mechanism inclosed therein, having a vertical shaft extending through said case, and record disk supported thereon, the combination therewith of a scale supported transversely over said disk, one edge of said scale being adjacent to a point of said reproducer when in contact with said disk; and means at each end of said scale adapted to hold it in position and to regulate its height above said disk, as described.

4. In a gramophone, the combination with an inclosing case, pivotal arm and reproducer thereon, motor mechanism therein having a vertical shaft, and record thereon; of an index plate supported transversely over said disk adapted to indicate the position of said reproducer on said record, and means for adjusting the position of said plate over said record and in relation to said reproducer, as described.

ALICE HENRY.

Witnesses:
THOMAS J. MORGAN,
JOSEPH STAAB.